July 3, 1956 — W. J. PHANE — 2,753,019
PNEUMATIC FABRIC BEAM STRUCTURE
Filed Feb. 17, 1951 — 2 Sheets-Sheet 1
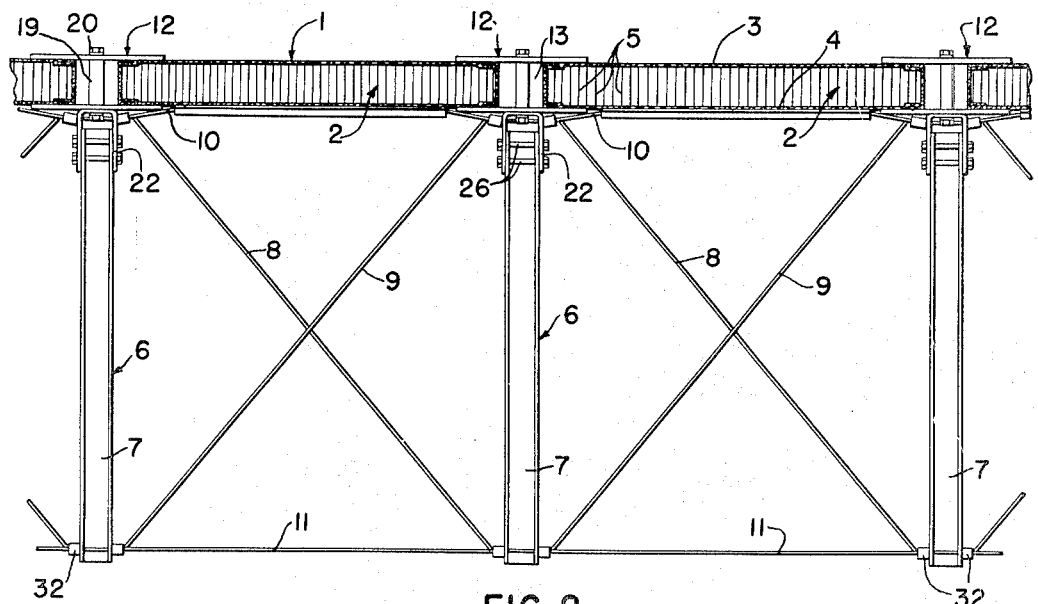
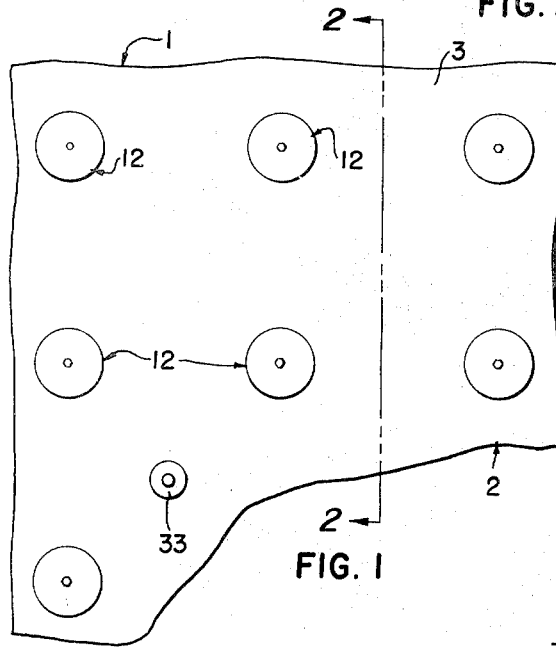
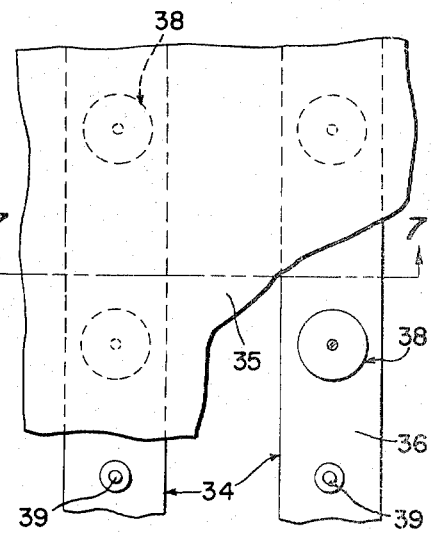
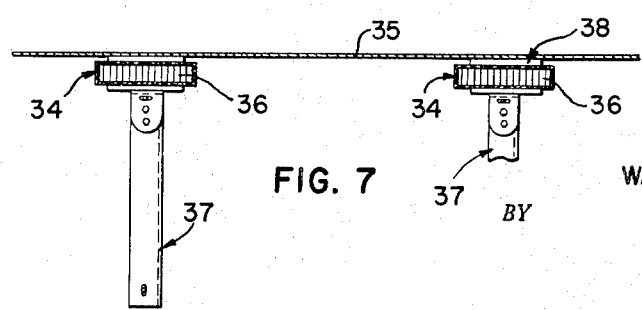
INVENTOR.
WALTER J. PHANE
BY R. L. Miller
ATTORNEY July 3, 1956 W. J. PHANE 2,753,019
PNEUMATIC FABRIC BEAM STRUCTURE
Filed Feb. 17, 1951 2 Sheets-Sheet 2
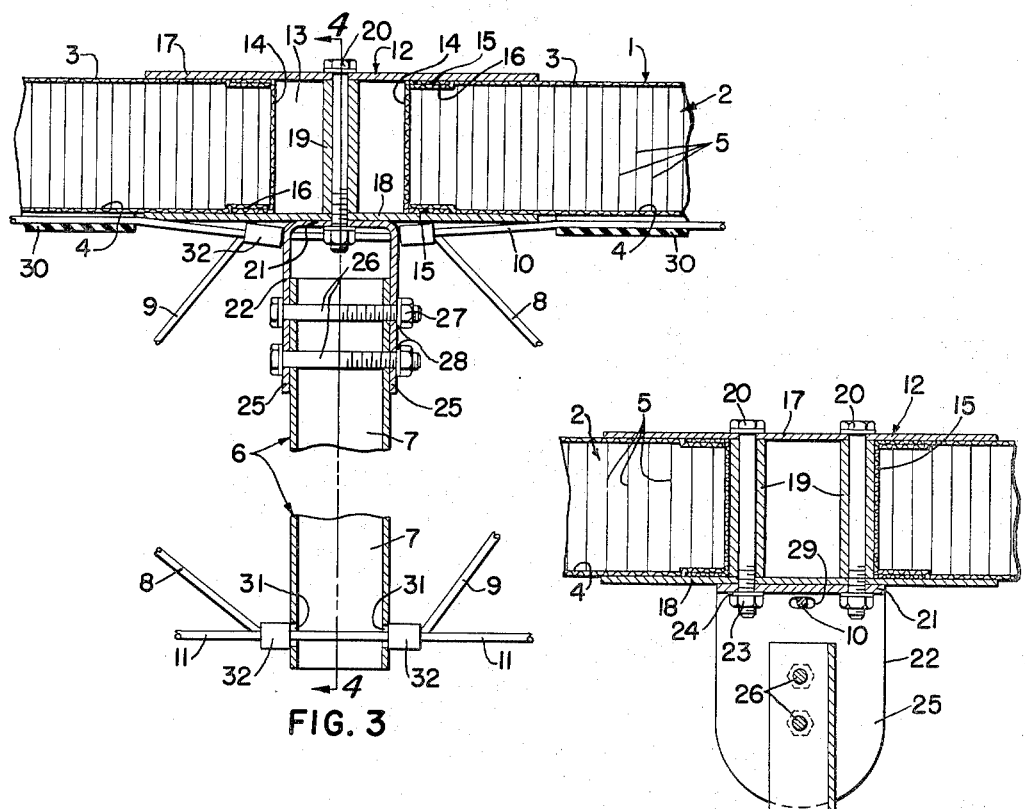
FIG. 3
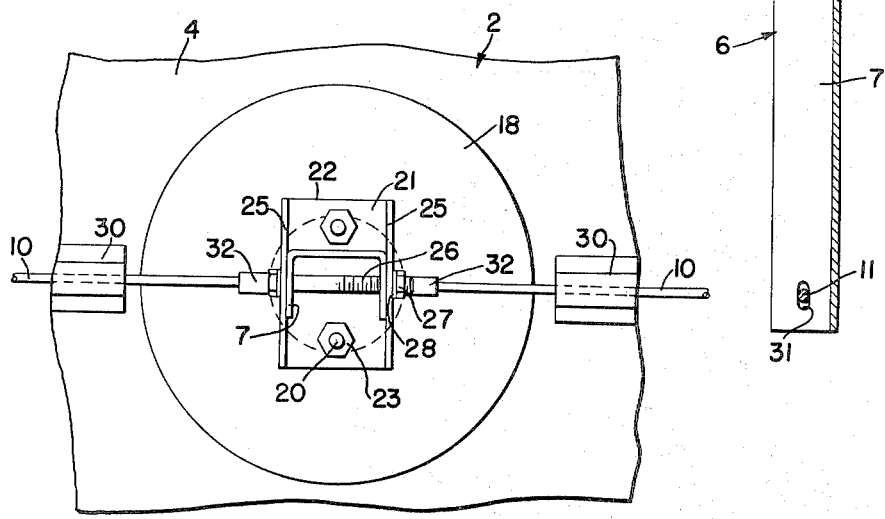
FIG. 4
FIG. 5
INVENTOR.
WALTER J. PHANE
BY
ATTORNEY

United States Patent Office 2,753,019
Patented July 3, 1956

2,753,019

PNEUMATIC FABRIC BEAM STRUCTURE

Walter J. Phane, Akron, Ohio, assignor, by mesne assignments, to The Goodyear Tire & Rubber Company, a corporation of Ohio Application February 17, 1951, Serial No. 211,525

1 Claim. (Cl. 189—37)

The present invention relates to a fluid-inflatable fabric structural element or beam of the type capable of employment in housing and other forms of building construction of a more or less temporary nature. More particularly, the invention pertains to a pneumatic fabric beam structure which embodies readily dismantlable elements comprising a fluid-inflatable fabric portion and a stiffening member resulting in a structure which is capable of withstanding comparatively wide variations in loading and stress.

There are numerous well known forms of temporary building units such as tents, canopies, shelters, and the like which are adapted to be quickly and easily disassembled for transporting from one place to another. Such conventional structures usually employ single plies of treated or rubberized fabrics for the walls and roofs thereof. However, such fabric constructions customarily have no strength or rigidity in themselves and thus ordinarily require some heavy and cumbersome frameworks or supporting structures in order to fashion them into any suitable form of self-supporting building construction.

The present invention contemplates a form of pneumatic fabric beam structure embodying a double ply fabric element having a plurality of substantially inextensible tie threads woven partly into each fabric ply which permit the plies to be disposed in predetermined spaced relation to each other when sealed at the marginal edges thereof and inflated. Such fabric elements are quite rigid upon inflation and, when deflated, can be readily transported from place to place with little difficulty. In order to render the inflatable fabric element sufficiently rigid for most structural purposes and conditions of loading and stress, a simple compact and light-weight framework of rigid stiffeners and cable ties may be employed as a tension member, while the fabric portion serves as the compression member of a simple trusslike framework.

It is an object of the present invention to provide a pneumatic fabric beam structure comprising an inflatable fabric element in combination with a stiffener element and suitable anchoring devices for securing the stiffener element and the fabric element together.

A further object of the present invention is to provide a pneumatic fabric beam structure which will serve both as a supporting element and as a portion of the outer wall of a temporary type of building.

Another and still further object of the present invention is the provision of suitable means for attaching and anchoring the stiffener element to the fabric element.

Other objects and advantages of the present invention will become apparent as the description of the structures illustrated in the accompanying drawings representing preferred embodiments of the invention proceeds.

In the drawings, Figure 1 is a partial plan view with parts broken away of one form of pneumatic beam structure embodying the principles of the present invention. Figure 2 is a vertical section taken substantially along the line 2—2 in Figure 1 with parts in elevation. Figure 3 is a partial section with parts in elevation corresponding generally to Figure 2, but at a greatly enlarged scale. Figure 4 is a vertical section of the structure illustrated in Figure 3 as seen from the line 4—4 therein with parts in elevation. Figure 5 is a plan view of the assembly illustrated in Figure 3 as seen from the underside of the structure. Figure 6 is a plan view corresponding generally to Figure 1, but illustrating another form of construction embodying the principles of the present invention. Figure 7 is a vertical cross-section taken along the line 7—7 in Figure 6.

The reference numeral 1 identifies the pneumatic fabric beam structure which embodies an inflatable fabric element 2. The inflatable fabric element 2 comprises a top ply 3, a bottom ply 4, and a plurality of closely spaced tie threads 5 which are woven at least partially into each of the fabric plies. The tie threads 5 are substantially inextensible and, therefore, insure the maintenance of a predetermined spacing of the top ply 3 and the bottom ply 4 when the edges of the fabric element are sealed and the resulting structure is inflated.

The inflatable fabric element 2, when employed in the pneumatic fabric beam structure 1, is associated with a stiffener element identified generally by the reference numeral 6. The stiffener element 6 is made up of a number of rigid members 7 which may take any suitable structural shape, being illustrated herein as channels. The rigid members 7 of the stiffener element 6 are maintained in properly spaced relation with respect to each other by means of the criss-crossed flexible substantially inextensible tension members or cables 8 and 9 as well as the similar parallel tension members or cables 10 and 11. The stiffener element 6 is capable of producing the required stiffening effect for the inflatable fabric element 2 in a plane normal thereto in order that the resulting pneumatic fabric beam structure 1 embodying these cooperating elements will withstand wide variations in loading and stress.

It is essential, in the production of a pneumatic fabric beam structure 1 which will insure positive cooperation between the inflatable fabric element 2 and the stiffener element 6, to provide a suitable way of securing the two elements together such, for example, as the anchoring devices or attaching means 12. The anchoring devices 12 are disposed at the apertures 13 extending through the inflatable fabric element 2. The apertures 13 are defined by a reinforcement or fabric liner 14 which renders the opening generally cylindrical in shape. The fabric liner 14 has its ends 15 flanged outwardly to form the joint 16 with the top ply 3 and the bottom ply 4 of the inflatable fabric element. The fabric liner 14 is of such length that it maintains the predetermined spacing between the top ply 3 and the bottom ply 4 of the inflatable fabric element 2 in addition to forming a suitable anchorage for the anchoring devices 12 with respect to the fabric element.

The anchoring devices 12, one of which is employed for each of the rigid members 7 of the stiffener element 6 comprises the bearing plates or clamping disks 17 and 18 which are disposed in contact with the top ply 3 and the bottom ply 4, respectively, of the inflatable fabric element 2. The spacing between the bearing plates 17 and 18 is maintained in corresponding relation to the spacing of the top and bottom plies 3 and 4, respectively, by means of a pair of tubular spacers 19 which extend through the aperture 13 in the inflatable fabric element 2. The bolts 20 extend through the spacers 19 and are secured to the bight portion 21 of a bifurcated attachment member 22 as by means of the nuts 23 and washers 24.

The bifurcated member 22 is provided with a pair of legs 25 projecting downwardly from the bight portion 21 and disposed in generally parallel relation to each other for engaging the one end of a rigid member 7 of the stiffener element 6. The rigid member 6 is secured to the legs 25 of the bifurcated member 22 by means of a pair of bolts 26 held in place therein by the nuts 27 and washers 28.

The elongated opening 29 extending through each of the legs 25 of the bifurcated member 22 adjacent the bight 21 thereof provides a suitable means for passing the tension member 10 therethrough adjacent to the bottom ply 4 of the inflatable fabric element 2. As a further means of securing the stiffener element 6 in operable relation to the inflatable fabric element 2 in the pneumatic fabric beam structure 1, there is provided a fabric saddle 30 which is secured to the bottom ply 4 of the inflatable fabric element 2 in such fashion that it encloses a portion of the tension member 10 between adjacent rigid members 7 of the stiffener element 6.

A pair of elongated openings 31 are also provided adjacent the end of each rigid member 7 opposite its attachment to the anchoring devices 12 for the passage therethrough of the tension member 11. The criss-crossed flexible tension members 8 and 9 are secured in place between adjacent rigid members 7 by means of pressed fasteners 32 or any other suitable forms of cable clamps which provide secure fastenings for the ends of these elements.

The anchoring devices 12 are highly advantageous in that the removal of one of the bolts 26 in the bifurcated member 22 thereof will enable the rigid member 7 in each instance to be rotated about its remaining bolt 26 into a position in a plane generally parallel to the plane of the inflatable fabric element 2 as defined by the top and bottom plies 3 and 4, respectively. This arrangement facilitates the rolling up of the entire pneumatic fabric beam structure 1, when the inflatable fabric element 2 is deflated, into a compact cylindrically shaped bundle with the rigid members 7 of the stiffener element 6 disposed in coaxial relation to the longitudinal axis of the bundle proper. The resulting bundle is capable of being transported from one place to another where it may be unrolled again for inflation of the inflatable fabric element 2 and re-erection of the structure. Upon replacement of the bolt 26 securing the rigid member 7 in place in a position normal to the plane of the inflatable fabric element as defined by the top and bottom plies 3 and 4, the structure is again ready for use.

The inflation of the inflatable fabric element 2 is achieved by means of a valve 33 shown in Figure 1 which may serve to inflate the entire expanse of the inflatable fabric element in the event that it extends over a considerable span embodying more than one of the stiffener elements 6. The valve 33 may be of a conventional type customarily used in inflatable rubberized fabric structures including boats, pontoons, and the like.

Referring now to the embodiment of the invention illustrated in Figures 6 and 7, the reference numeral 34 designates each of the pneumatic fabric beam structures generally. In the construction illustrated herein, the pneumatic fabric beam structures 34 are arranged in spaced generally parallel relation to each other and are adapted to support a single ply fabric wall or covering 35 which forms the exposed surface of the structure. Each pneumatic fabric beam structure 34 is generally similar in construction to that of the pneumatic fabric beam structure 1 described in detail above except that the inflatable fabric element 36 is not made continuous in the manner of its counterpart 2.

With this exception, the structure shown in Figures 6 and 7 is identical to that of Figures 1 to 5, inclusive. The stiffener element 37 and the anchoring devices 38 of the pneumatic fabric beam structure 34 are constructed in exactly the same fashion as the stiffener element 6 and the anchoring devices 12 of the pneumatic fabric beam structure 1. Where a single valve 33 was used to inflate the continuous pneumatic fabric beam structure 1, it is necessary to employ a single valve 39 for each of the individual pneumatic fabric beam structures 34.

While certain representative embodiments and details have been shown for the purpose of illustrating the invention, it will be apparent to those skilled in this art that various changes and modifications may be made therein without departing from the spirit or scope of the invention.

I claim:

A pneumatic fabric beam structure comprising an inflatable fabric element having two fabric plies maintained in spaced generally parallel relation by a plurality of substantially inextensible tie threads woven into each ply when sealed at the edges and inflated; spaced fabric reinforcements defining spaced tubular apertures extending through the fabric element; a stiffener element embodying a plurality of rigid members maintained in spaced relation to each other by a pair of mutually parallel flexible substantially inextensible cables between which the rigid members are disposed and a plurality of crossed cables; a detachable anchoring device securing each rigid member of the stiffener element to the fabric element below an aperture and substantially normal to the plane of the fabric plies, said anchoring means having a pair of spaced bearing plates disposed in contact with each ply of the fabric element at opposite ends of the aperture therein, spacing means extending through the aperture maintaining the bearing plates in predetermined spaced relation, means urging the plates against the spacing means, and a bifurcated member engaging an end of a rigid member of the stiffener element; and detachable means securing each rigid member in place in its bifurcated member, said anchoring device being readily detached from the fabric element when disassembling the beam.

References Cited in the file of this patent

UNITED STATES PATENTS

| | | |
|---|---|---|
| 225,060 | Johnson | Mar. 2, 1880 |
| 511,472 | Sumovski | Dec. 26, 1893 |
| 765,382 | Fleming | July 19, 1904 |
| 2,381,394 | Beach | Aug. 7, 1945 |
| 2,636,457 | Finlay et al. | Apr. 28, 1953 |

FOREIGN PATENTS

| | | |
|---|---|---|
| 12,968 | Great Britain | of 1850 |
| 454,200 | France | June 27, 1913 |